United States Patent
Yu et al.

(10) Patent No.: US 7,320,061 B2
(45) Date of Patent: Jan. 15, 2008

(54) STORAGE OPTIMIZATION FOR VARRAY COLUMNS

(75) Inventors: Qin Yu, Belmont, CA (US); Subramanian Muralidhar, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 547 days.

(21) Appl. No.: 10/912,426

(22) Filed: Aug. 5, 2004

(65) Prior Publication Data

US 2006/0047670 A1    Mar. 2, 2006

Related U.S. Application Data

(60) Provisional application No. 60/569,730, filed on May 10, 2004.

(51) Int. Cl.
*G06F 12/00* (2006.01)

(52) U.S. Cl. .................................................. 711/170

(58) Field of Classification Search ................ 711/170, 711/171; 707/100
See application file for complete search history.

(56) References Cited

U.S. PATENT DOCUMENTS

| 5,857,203 | A | * | 1/1999 | Kauffman et al. | 707/200 |
| 6,061,690 | A | * | 5/2000 | Nori et al. | 707/103 R |
| 6,513,043 | B1 | * | 1/2003 | Chan et al. | 707/102 |

* cited by examiner

*Primary Examiner*—Hiep T. Nguyen
(74) *Attorney, Agent, or Firm*—Aka Chan LLP (57) ABSTRACT

Methods and apparatus for efficiently storing data in a variable array (VARRAY) of a database system are disclosed. A method for storing data in a VARRAY having an associated large object segment in a system having a memory and a kernel includes determining a size of data to be inserted into the VARRAY. The method also includes determining when the size of the data is less than a threshold value, and storing the data as inline raw data in a column of the VARRAY that is present in the memory when the size of the data is less than the threshold value. When the size of the data is not less than the threshold value, the data is stored in a large object that is associated with the VARRAY. Further, when a VARRAY type is evolved to have a larger maximum size, existing data is not migrated or transformed.

33 Claims, 9 Drawing Sheets

STORAGE OPTIMIZATION FOR VARRAY COLUMNS

CROSS REFERENCE TO RELATED PATENT APPLICATION

This patent application claims priority of U.S. Provisional Patent Application No. 60/569,730, filed May 10, 2004, which is incorporated herein by reference in its entirety.

BACKGROUND OF THE INVENTION

1. Field of Invention

The present invention relates to database systems. More specifically, the invention relates to enabling data in variable arrays (VARRAYs) to be efficiently stored, particularly when a size of a VARRAY column is not specified.

2. Description of the Related Art

The amount of memory space available in computing systems is typically limited, so it is crucial to efficiently allocate the memory space for usage. As such, the determination of where and how to store data within a computing system may be based upon how much data is to be stored. For example, in some instances, a relatively small amount of data may be stored as inline data in a column of a table, whereas a relatively large amount of data may be stored as an object that is referenced by the table.

A variable array or VARRAY is a variable-length ordered list of values of one type that may be specified by a user and created in a database, as for example a database available from Oracle, Inc. of Redwood Shores, Calif. That is, a VARRAY is an array, or an ordered set of data elements of the same type, of variable size. Each element in a VARRAY generally has an index, which is a number that corresponds to the position of the element in the VARRAY. The number of elements in a VARRAY is typically considered to be the size of the VARRAY. Typically, when a VARRAY type is declared, a maximum size for the VARRAY, or an array limit, is specified.

When creating a VARRAY, or a table of VARRAY columns, if there is no storage clause for the VARRAY, i.e., if a user declines to specify an array limit, a VARRAY column is created based on a maximum possible size for the VARRAY column. The maximum possible size is generally based on the element size of elements to be stored in the VARRAY, a maximum number of elements that may potentially be stored in the VARRAY, and a necessary amount of system control information.

Figure 1:
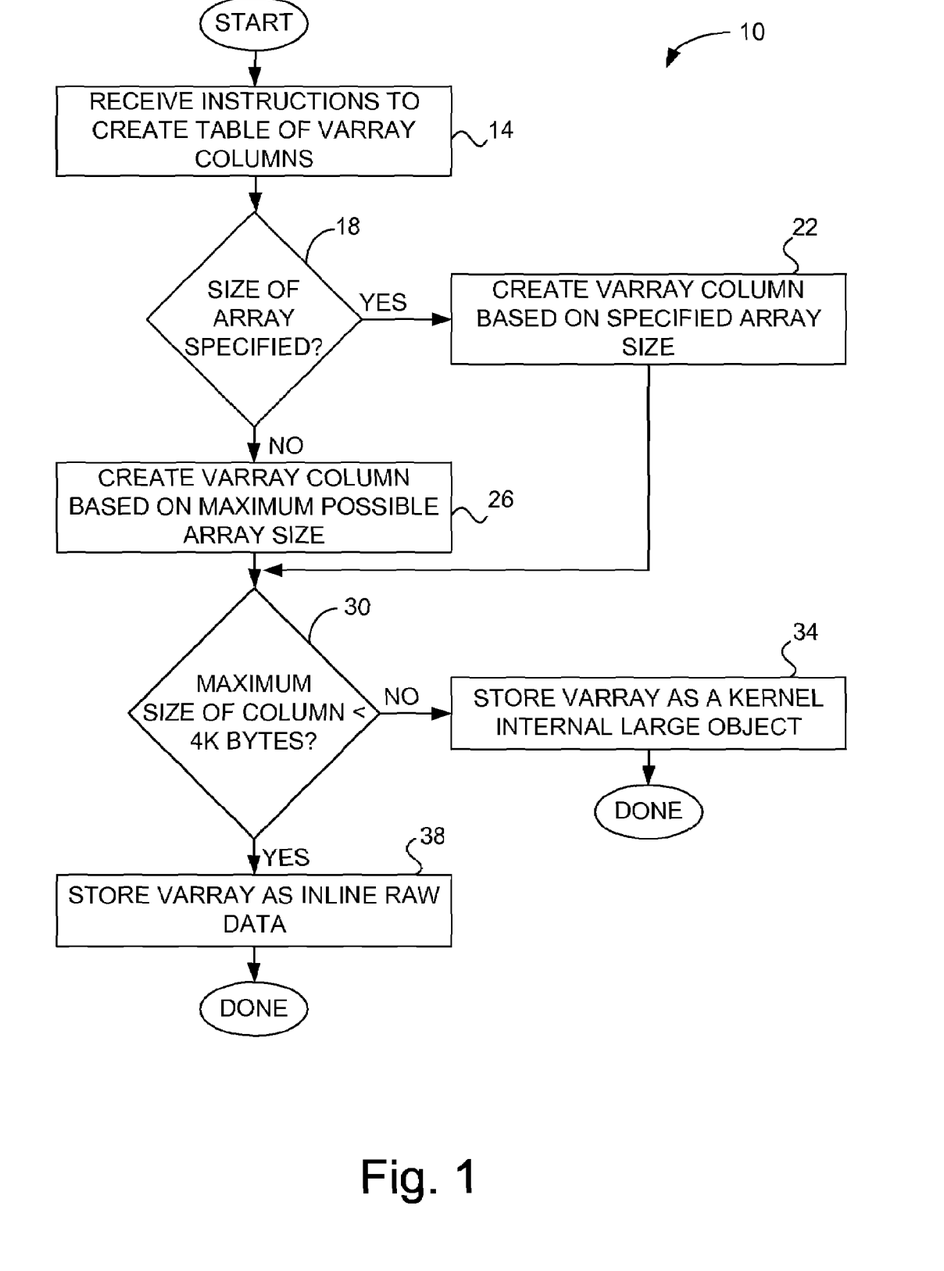
FIG. 1 is a process flow diagram which illustrates one method of creating a table of VARRAY columns and storing data associated with the VARRAY columns.

FIG. 1 is a process flow diagram which illustrates one method of creating a VARRAY, or a table of VARRAY columns, and storing data associated with the VARRAY. A method 10 of creating and using a table of VARRAY columns begins at step 14 in which instructions to create a VARRAY type, VARRAY, are received. Once the instructions are received, it is determined whether the array limit for the VARRAY type, or a maximum number of elements which may be contained in a VARRAY, is specified in step 18.

If the determination in step 18 that the size of a VARRAY column is specified, then a VARRAY column is determined to be created based on the specified size in step 22. Alternatively, if it is determined in step 18 that the size of the VARRAY column is not specified, i.e., that there is no storage clause for the table of VARRAY columns, then a VARRAY column is determined to be created in step 26 based on a maximum possible array size. Typically, the maximum possible array size may be determined by a maximum number of elements multiplied by the maximum size of an element, plus bytes needed to store system control information.

From steps 22 and 26, process flow moves to step 30 in which it is determined if the maximum size of a VARRAY column is less than approximately 4K bytes. As will be appreciated by those skilled in the art, the maximum size of data that may generally be stored inline per row for a column is approximately 4K bytes. If it is determined that the maximum size of a column is less than approximately 4K bytes, data is stored in the VARRAY column as inline raw data in step 38, and the method of creating a table of VARRAY columns and storing data in the VARRAY columns is completed. Alternatively, if it is determined that the maximum size of a VARRAY column is greater than or approximately equal to 4K bytes, then data is effectively stored in the VARRAY column as a kernel internal large object (LOB), and the method of creating a table of VARRAY columns and storing data in the VARRAY columns is completed.

Figure 2:
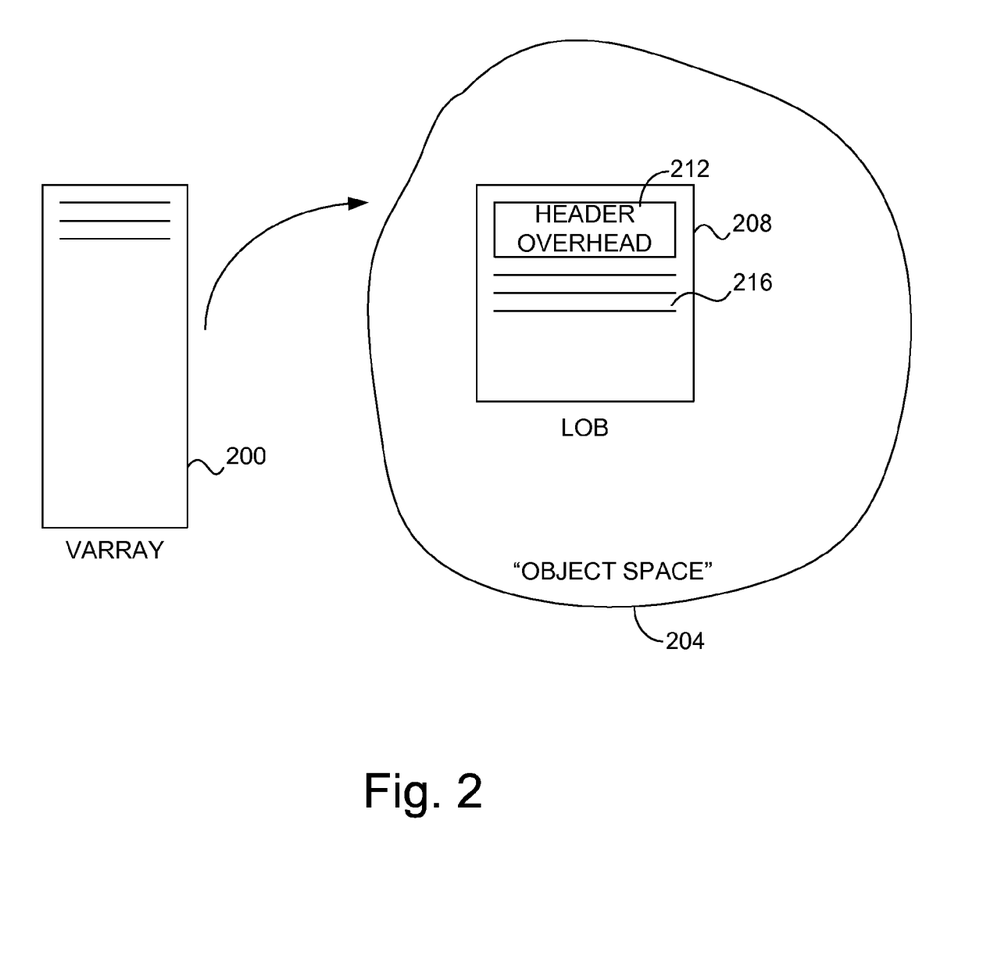
FIG. 2 is a diagrammatic representation of a kernel internal large object which is allocated for storage for of a VARRAY column.

When an array limit, or a maximum number of elements, for a VARRAY type is not specified when the VARRAY type is created, a LOB is generally allocated for data storage if the maximum possible size of each VARRAY column is greater than approximately 4K bytes. With reference to FIG. 2, a LOB which is allocated for storage for a VARRAY column will be described. A VARRAY 200 that either has a maximum possible size of approximately 4K bytes or more when no array limit is specified, or has a specified array limit of approximately 4K bytes or more, is arranged to have data stored in an object space 204 as a LOB 208. When a LOB 208 is allocated for the storage of VARRAY data 216, LOB header information or overhead 212 adds at least another several bytes, as for approximately thirty bytes, to the size of LOB 208.

When LOB 208 is allocated because VARRAY 200 has a maximum possible size of approximately 4K bytes or more, and no array limit is specified, VARRAY data 216 stored in LOB 208 may be much less than approximately 4K bytes. That is, the size of actual VARRAY data 216 may be suitable for storage as a LOB locater with inline data, even though VARRAY data 216 is stored in LOB 208 because LOB 208 has been allocated. When VARRAY data 216 is significantly less than approximately 4K bytes, as for example less than approximately thirty bytes, but stored in LOB 208, the extra bytes associated with header overhead 212 may represent significant storage overhead. When header overhead 212 represents relatively significant storage overhead, performance issues may arise during data write and data read operations. Such performance issues may adversely affect the efficiency with which data write and data read operations may be performed.

Storing data in a LOB segment, i.e., out of line, often has significant performance impacts due to additional I/O operations which are used to fetch the stored data. In addition, storage in a LOB segment is typically allocated in discrete chunks, e.g., in some multiple of a database block size. Hence, even if an amount of data to be stored is significantly less than the size of the discrete chuck into which the data is to be stored, the entire chunk would be allocated, which results in significant overhead.

Figure 3:
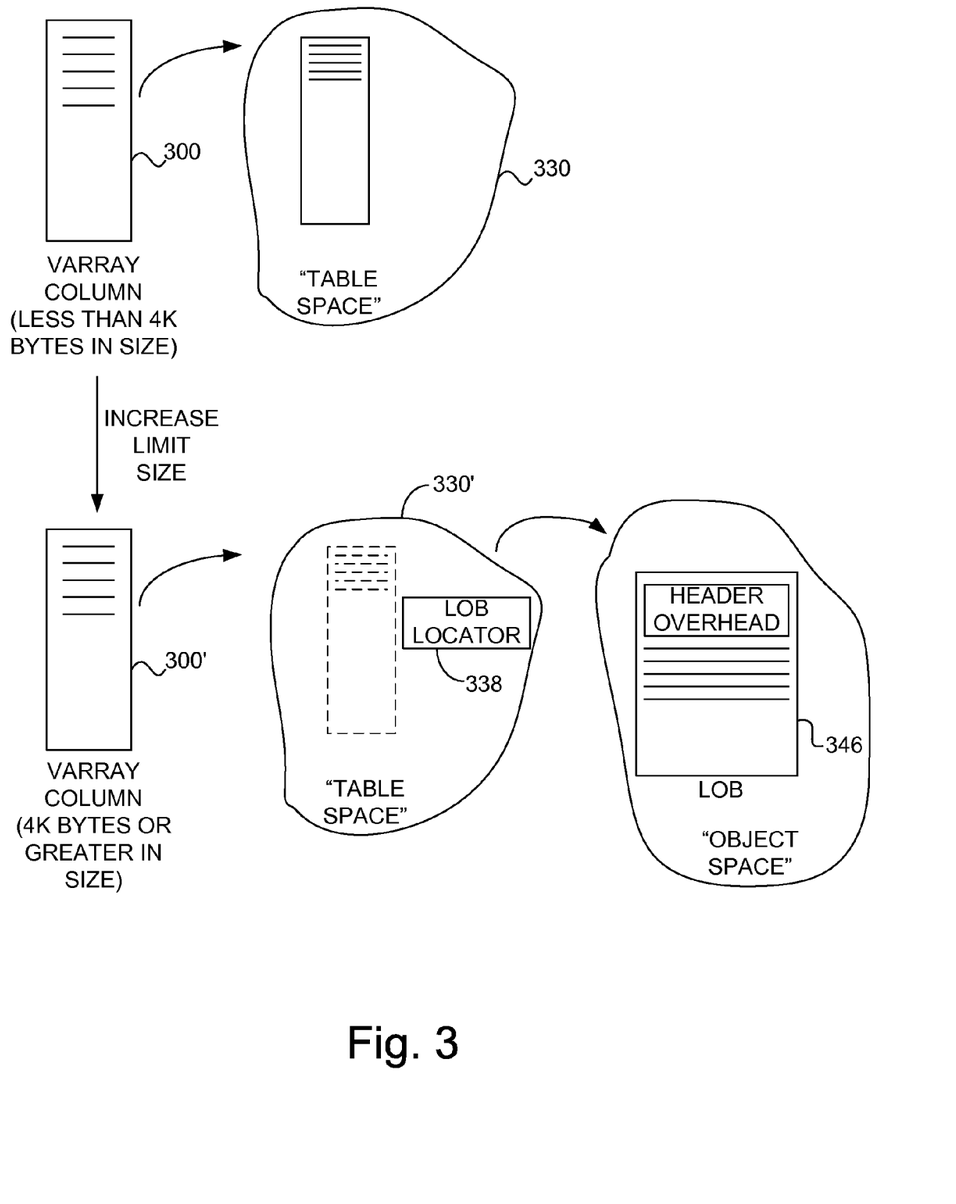
FIG. 3 is a diagrammatic representation of how VARRAY data is stored before and after a limit size of a VARRAY column is increased from less than approximately 4K bytes in size to at least approximately 4K bytes in size.

VARRAY types generally have an evolution feature which enables a user to alter, e.g., increase, the size of a VARRAY type. The size of a VARRAY type may be increased in response to an increase in the size of an element type stored in VARRAY columns, or generally in response to an increase in a limit size of a VARRAY type. When the limit size of a VARRAY type is increased and results in the maximum size of a VARRAY column increasing to approximately 4K bytes or greater, then VARRAY data that is previously stored in the VARRAY columns generally is no longer stored as inline raw data, and is instead stored in a LOB. a LOB FIG. 3 is a diagrammatic representation of how VARRAY data is stored before and after a limit size of a VARRAY column is increased from less than approximately 4K bytes in size to at least approximately 4K bytes in size. A VARRAY column 300 that is less than approximately 4K bytes in size is arranged to have its data stored inline in a table space 330. When a limit size of VARRAY column 300 is increased, as for example to approximately 4K bytes or greater in size, VARRAY column 300' which is approximately 4K bytes or greater results. In addition, a LOB 346 in an object space 342 is created to store data associated with VARRAY column 300'.

Existing VARRAY data, which is stored in table space 330' as inline raw data, is effectively moved into LOB 346. In general, each row of existing VARRAY data of a column is stored in a separate LOB 346. A LOB locator 338 is then stored into table space 330' to identify LOB 346. A LOB The need to essentially modify a VARRAY image to be stored in LOB 346, and to insert LOB locator 338 into table space 330' is often inefficient, as the process of storing previously inlined raw data into LOB 346, and inserting LOB locator 338 into table space 330' is relatively slow. When there are a relatively large number of rows associated with VARRAY column 300', the process of storing VARRAY data that was previously inlined as raw data in table space 330 may be particularly time consuming. Further, evolving a VARRAY type typically requires that existing data be modified, which is also time consuming and may utilize a significant amount of overhead.

Therefore, what is needed is a method and an apparatus which allows VARRAY types to be efficiently created, particularly when array limits are not specified, and also allows for less time-consuming evolution features associated with the VARRAY types. That is, what is needed is a system which substantially minimizes the occurrences of storing relatively small amounts of data in kernel internal LOBs, and also significantly reduces the need to effectively copy inline raw data into kernel internal LOBs when a VARRAY limit size is increased. typically time consuming operations relating to data stored in VARRAY columns

SUMMARY OF THE INVENTION

The present invention relates to efficiently storing data in a variable array (VARRAY) used in a database system. According to one aspect of the present invention, a method for storing data in a variable array having an associated large object segment in a computing system having a memory and a kernel includes determining a size of data to be inserted into the variable array. The method also includes determining when the size of the data is less than a threshold value, and storing the data as inline raw data in a column of the variable array that is present in the memory when it is determined that the size of the data is less than the threshold value. When it is determined that the size of the data is not less than the threshold value, the data is stored in a large object that is associated with the variable array. In one embodiment, the threshold is approximately equal to an approximately maximum number of bytes which may possibly be stored in a row of the column.

When a VARRAY that is created for use within a database system is not specified with an upper array limit, the VARRAY is typically created using a maximum possible size for the VARRAY. When this maximum possible size is at least as large as a threshold value, e.g., a maximum number of bytes that may be stored in a row of a column of the VARRAY, and VARRAY data that is to be inserted or updated in a VARRAY column is at least as large as the threshold value, the VARRAY data is stored out-of-line in a kernel internal large object while an large object locator is stored in the VARRAY column. Alternatively, when the size of the VARRAY data that is to be inserted or updated in the VARRAY column does not exceed the threshold value, the VARRAY data is stored as a LOB locator with inline data in the VARRAY column. By enabling a location at which VARRAY data is stored to essentially be determined based on the actual size of the VARRAY data, even when a VARRAY is using an array limit that is the maximum possible size for the VARRAY, the storage of VARRAY data in VARRAY columns is effectively optimized.

According to another aspect of the present invention, a variable array data structure includes a first segment and a first column. The first segment indicates that the data structure is arranged to include at least one column which is associated with a first set of data that has at least a threshold number of byte. The first column contains a second set of data which includes less than the threshold number of bytes and is inlined in the first column.

According to still another aspect of the present invention, a method for storing VARRAY data, which includes an associated large object segment, in a VARRAY associated with a computing system includes determining a size of the VARRAY data, determining when the size of the VARRAY data is less than a threshold value, and inlining the VARRAY data in a first column of the VARRAY that is present in the table space when it is determined that the size of the VARRAY data is less than the threshold value. When it is determined that the size of the VARRAY data is not less than the threshold value, the method also includes storing the VARRAY data out-of-line in a large object internal to a kernel as well as storing a large object locator in the VARRAY that identifies the large object and is stored in a second column of the VARRAY.

In accordance with one other aspect of the present invention, a method for evolving a VARRAY created using an array limit that is less than a threshold array limit involves increasing a size of the VARRAY from less than the threshold array limit to at least the threshold array limit, and storing a flag that is arranged to indicate that a column of the VARRAY in table space may include both inline VARRAY data and out-of-line VARRAY data that is stored in an associated large object. In one embodiment, the method also includes determining a size of VARRAY data to be stored in the column, determining when the size of the VARRAY data is less than a threshold value, inlining the string of VARRAY data in the column of the VARRAY when it is determined that the size of the string of VARRAY data is less than the threshold value, and storing the string of VARRAY data out-of-line in a large object internal to a kernel when it is determined that the size of the string of VARRAY data is not less than the threshold value.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

A variable array (VARRAY) type is generally used to represent a variable-length ordered set of elements. Since the size of the actual data stored in a VARRAY is also variable, the amount of storage space needed to store VARRAY data associated with the VARRAY may vary widely. When a VARRAY type is specified without an array limit, the VARRAY is typically created based on the maximum size associated with the VARRAY type. When the maximum size is greater than or equal to approximately 4K bytes, a kernel internal large object (LOB) is created to store data associated with a column of the VARRAY. When the actual size of data associated with the column of the VARRAY is significantly less than 4K bytes, the use of a LOB to store the data is inefficient, and may cause performance issues associated with the use of the VARRAY.

By substantially optimizing the storage of data in VARRAY columns, unnecessary overhead associated with LOBs may often be eliminated, better performance of an overall system may be achieved, and efficiency of VARRAY related operations or features, e.g., VARRAY type evolution, may be improved. In one embodiment, when a VARRAY type is specified without an array limit and the maximum size of a column of the VARRAY is such that a kernel internal LOB would be used to store data associated with a column, a LOB segment may be allocated in memory, or a table space. However, data that is to be stored in the column is not stored in a LOB unless the data has a size that is greater than or approximately equal to the maximum size of data that may generally be stored inline in the table space. When the data has a size that is less than the maximum size of data that may be stored inline, then the data is stored inline in the table space associated with the VARRAY. Hence, by essentially avoiding substantially always storing VARRAY data into kernel internal LOBs if a VARRAY type is specified without an array limit and the maximum size of a column of the VARRAY is greater than the number of bytes that may be stored inline in a row of a column, the efficiency with which VARRAY data may be stored and retrieved is enhanced. That is, even though a LOB segment may be allocated for a VARRAY column, if the actual data associated with the VARRAY column is relatively small, or at least smaller than an upper limit for the size of data that may be stored inline in a row of a table, the actual data may be stored as a locator with inline data, thereby effectively eliminating a need to create a LOB with LOB header information for the storage of the actual data.

Figure 4A:
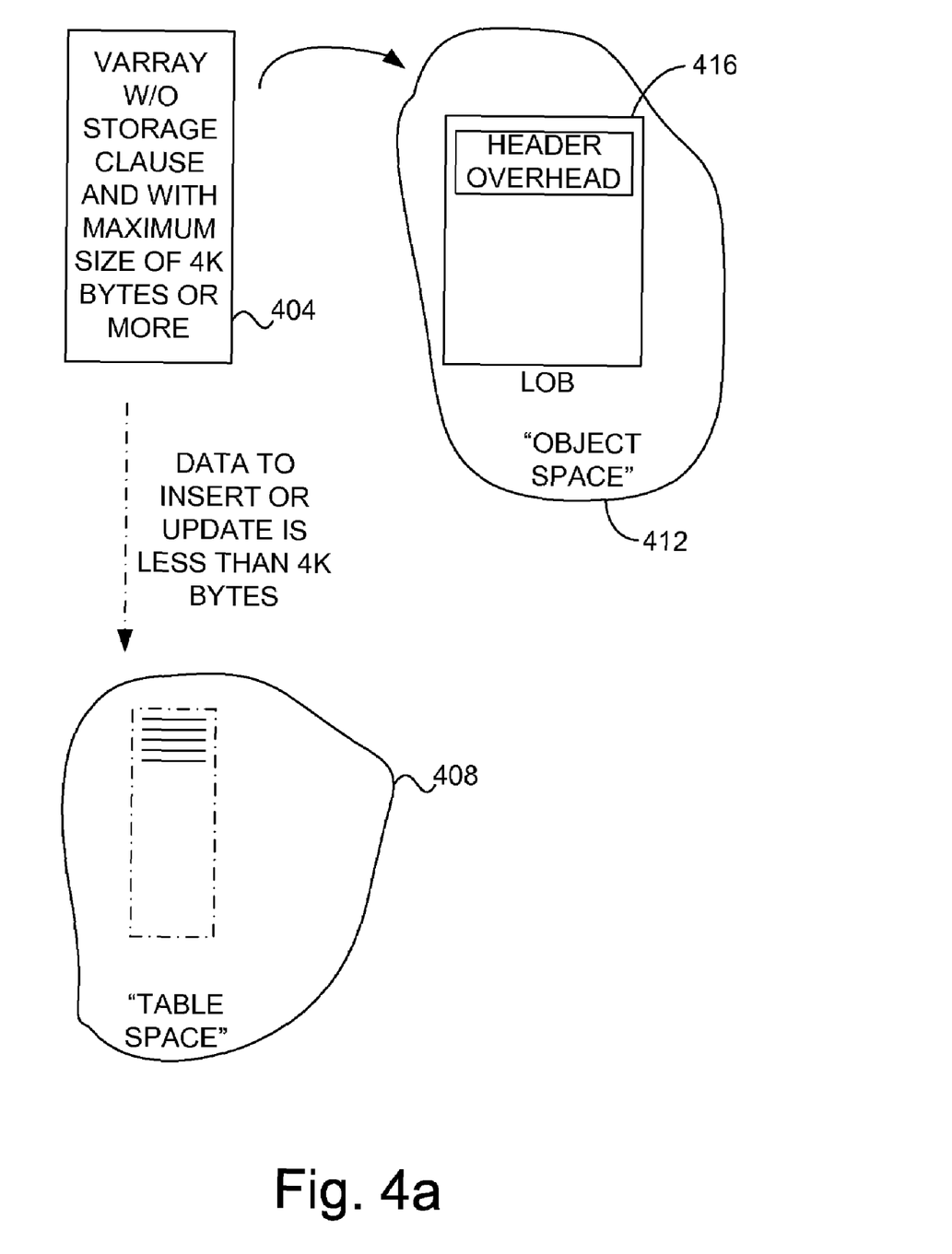
FIG. 4a is a diagrammatic representation of how data that is less than a threshold amount, e.g., less than approximately 4K bytes in size, is stored when a LOB segment has been allocated in accordance with an embodiment of the present invention.

With reference to FIG. 4a, the storage of data that is less than a threshold amount, e.g., less than approximately 4K bytes in size, when a LOB segment has been allocated will be described in accordance with an embodiment of the present invention. A VARRAY 404 that was not specified with a storage clause and has a maximum size of approximately 4K bytes or more is typically allocated with a LOB segment in a table in a table space 408 associated with VARRAY 404. When VARRAY data associated with VARRAY 404 has a size that is approximately 4K bytes or more is to be inserted into a VARRAY column, the VARRAY data is stored as a kernel internal LOB 416 in an object space 412. It should be appreciated that when VARRAY data associated with a VARRAY column that is to be updated is approximately 4K bytes or greater in size, the updated data is stored in LOB 416, while a LOB locator (not shown) may be written inline in the VARRAY column in table space 408 to identify LOB 416, as will be discussed below with respect to FIG. 4b.

When VARRAY data that is less than approximately 4K bytes in size is effectively to be inserted into a VARRAY column of VARRAY 404, even though a LOB segment has been allocated, the VARRAY data is stored as a LOB locator with inline data into table space 408. That is, VARRAY data that is less than approximately 4K bytes in size is not stored as a LOB in object space 412, but is instead stored into table space 408. In general, when VARRAY data that is to be updated with respect to a VARRAY column is less than approximately 4K bytes in size, the VARRAY data is also updated in table space 408.

The storage of VARRAY data that is less than approximately 4K bytes in size into table space 408, even though a LOB segment has been allocated, results in a more efficient write process, as well as a more efficient read process, when the VARRAY data is to be accessed. The increased efficiency results, at least in part, from not having to access a LOB, and not having to write, or to read, any header overhead contained in a LOB. Since a LOB segment allocates data in chunks that are generally multiples of a database block size, significant space overheads may be avoided with storing data that is less than approximately 4K bytes in size. Further, space in object space 412 may be allocated for other uses when VARRAY data is inlined as raw data in table space 408 whenever possible.

Figure 4B:
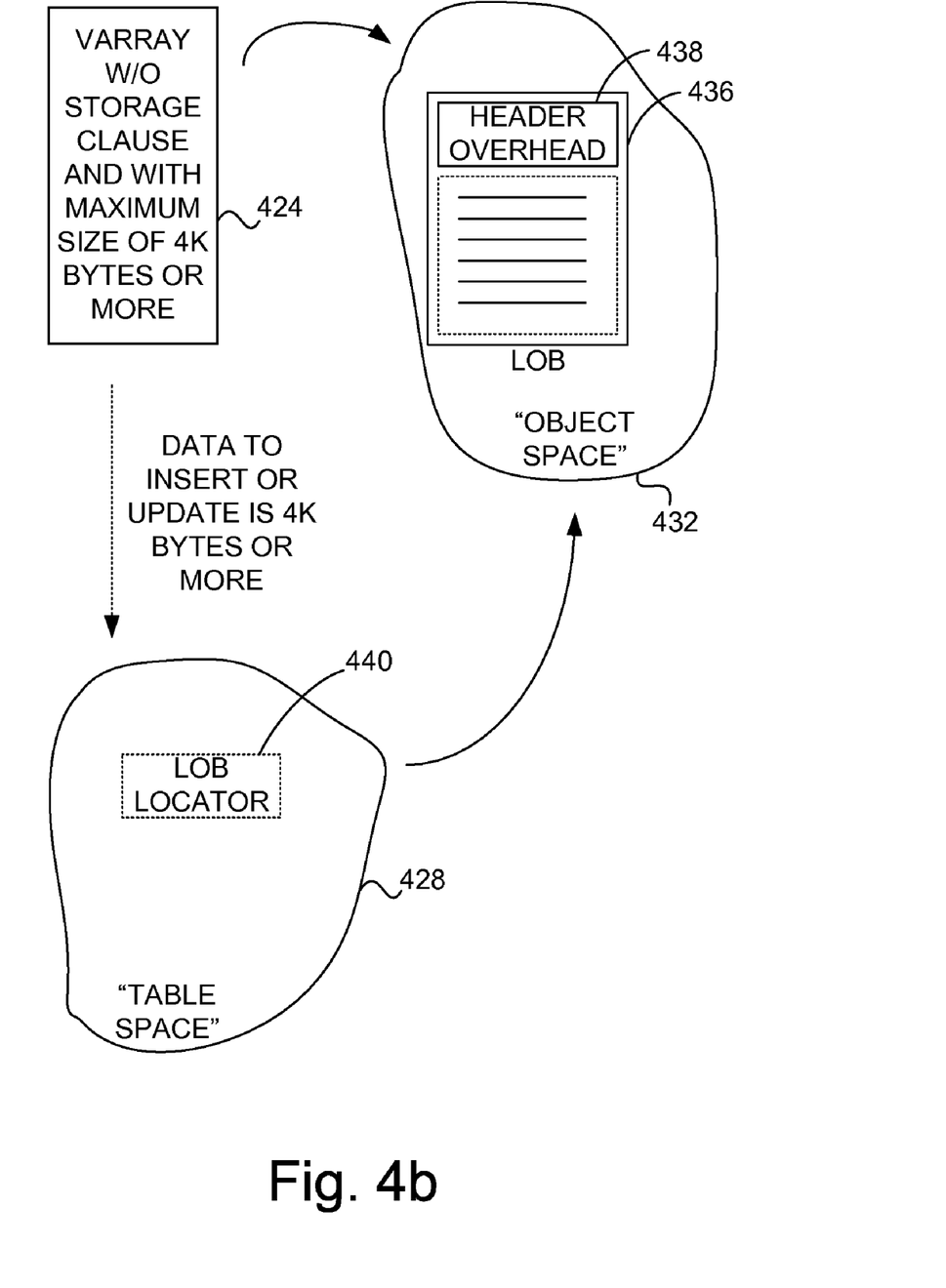
FIG. 4b is a diagrammatic representation of the storage of VARRAY data that is approximately 4K bytes or more in size in accordance with an embodiment of the present invention.

If VARRAY data to be inserted into a column of a VARRAY, i.e., a VARRAY column which was not created with a storage clause and has a maximum size of 4K bytes or more, includes approximately 4K bytes or more, the VARRAY data is inserted into a LOB, while a LOB locator is written into table space associated with the VARRAY column. FIG. 4b is a diagrammatic representation of the storage of VARRAY data that is approximately 4K bytes or more in size in accordance with an embodiment of the present invention. A VARRAY 424 which was created without a storage clause and has a maximum size of 4K bytes or more is generally allocated with a LOB segment which is allocated in a table space 428. As discussed above with respect to FIG. 4a, when VARRAY data associated with a column of VARRAY 424 is to be inserted or updated and is less than approximately 4K bytes in size, the VARRAY data is stored in table space 428.

When VARRAY data to be inserted or updated in VARRAY 424 is approximately 4K bytes or more in size, the VARRAY data is stored in a LOB 436 within an object space 432. A LOB 436, which include header overhead 438 that includes information associated with LOB 436, is typically allocated for each column associated with VARRAY 424 which includes approximately 4K bytes or more. A LOB locator 440, which is arranged to identify LOB 436, is then stored into table space 428 to enable LOB 436 to be identified with VARRAY data which corresponds to a VARRAY column of VARRAY 424. In one embodiment, LOB locator 440 may be written inline within space allocated to a VARRAY column.

Figure 5:
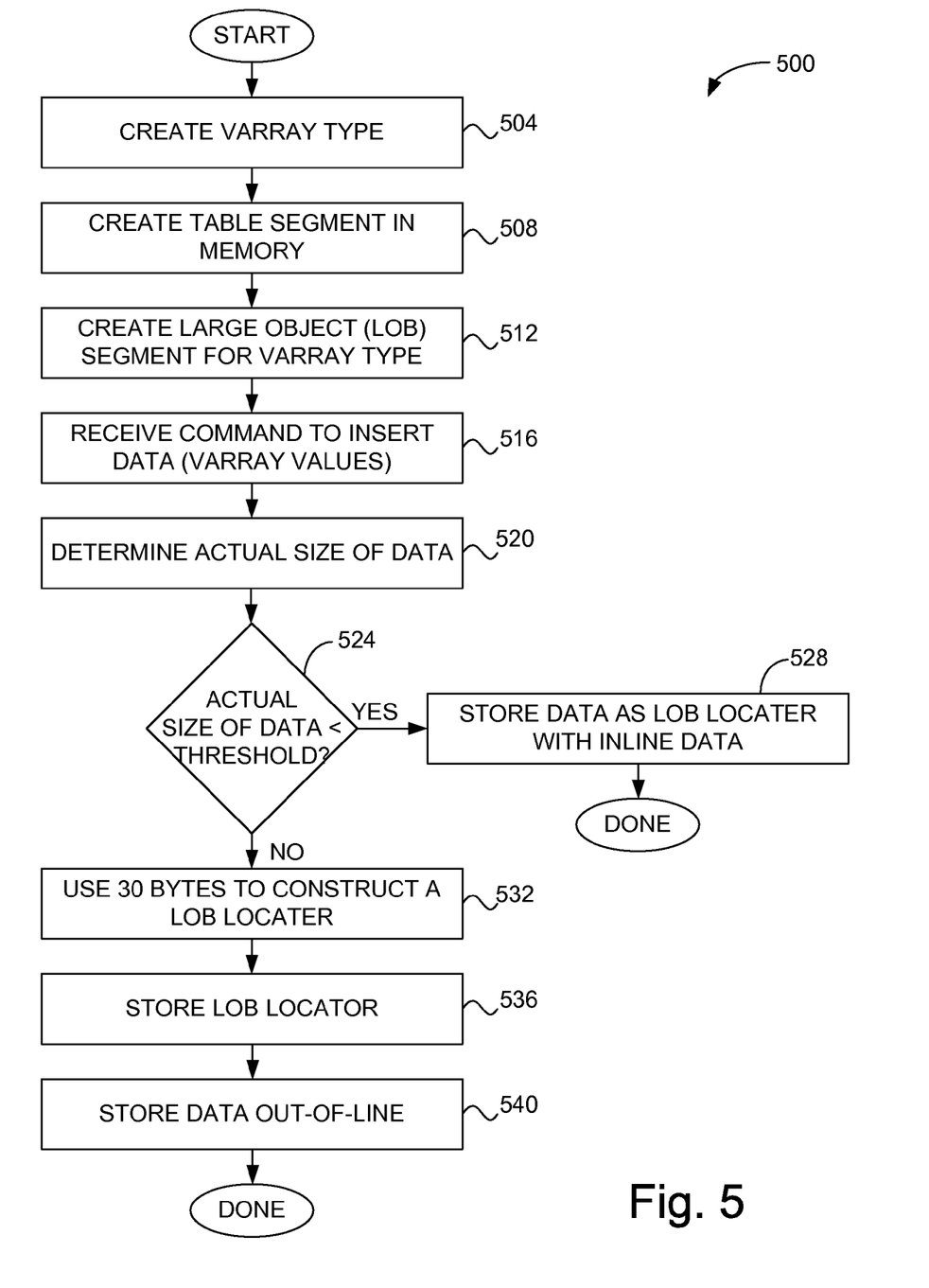
FIG. 5 is a process flow diagram which illustrates the steps associated with one method of storing data in a VARRAY column of a VARRAY for which no storage clause is specified and for which a maximum size of the VARRAY is greater than or equal to a threshold in accordance with an embodiment of the present invention.

Referring next to FIG. 5, the steps associated with one method of storing data in a VARRAY column of a VARRAY for which no storage clause is specified and for which a maximum size of the VARRAY is greater than or equal to a threshold will be described in accordance with an embodiment of the present invention. A process 500 of storing data in a VARRAY column begins at step 504 in which a VARRAY type is created, as for example in response to a command to create a VARRAY associated with a database system, e.g., an Oracle RDBMS system available from Oracle, Inc. of Redwood Shores, Calif. The VARRAY type that is created allows for size limits and element types associated with the VARRAY type to be specified. If a size limit is not specified, an array size limit for a VARRAY column of the VARRAY type is typically determined to be the maximum possible size of the VARRAY. In the described embodiment, an array size limit or the amount of data that may be stored in a VARRAY is not specified, and the maximum possible size of the VARRAY is greater than or equal to a threshold. The threshold may generally be widely varied. In the described embodiment, the threshold is approximately 4K bytes, or approximately a maximum number of bytes which may be stored inline per row for a VARRAY column.

Once the VARRAY is created with a VARRAY column, a table segment in memory, e.g., memory of a disk, or table space that includes the VARRAY column is created in step 508. A LOB segment for the VARRAY type is then created in step 512, and stored in the memory, if the VARRAY created in step 504 is such that the VARRAY column has a maximum size that is greater than or approximately equal to a threshold, e.g., a threshold of approximately 4K bytes.

A command to insert VARRAY data, or VARRAY values, into the table segment is received in step 516. The actual size of the VARRAY data to be inserted into a VARRAY column associated with the VARRAY is determined in step 520. The determination of the actual size may involve determining how many elements are included in VARRAY data, and determining a size of each element. After the actual size of the VARRAY data is determined in step 520, it is determined in step 524 whether the actual size of the VARRAY data is less than a threshold. The threshold may be approximately 4K bytes, or approximately a maximum number of bytes which may be stored in line per row for a VARRAY column, as discussed above.

If it is determined that the actual size of the data is less than the threshold, the VARRAY data is stored as a LOB locator with inline data in a VARRAY column in step 528, and the process of storing data in a VARRAY column is completed. Alternatively, if it is determined in step 524 that the actual size of the data to be inserted is greater than or approximately equal to the threshold, then a LOB locator is constructed in step 532. The LOB locator, which is used to identify a LOB that is arranged to contain the VARRAY data, may include any number of bytes, e.g., approximately thirty bytes. The LOB locator is then stored in step 536 into the table space or memory, and the VARRAY data is stored out-of-line, or into a LOB in object space, in step 540. Once the VARRAY data is stored out-of-line, the process of storing VARRAY data is completed.

Allowing a VARRAY to include VARRAY columns with data stored inline and VARRAY columns with data stored in a LOB, i.e., allowing a VARRAY inline image and LOB data to substantially coexist in VARRAY columns of a VARRAY, if there is no storage clause for the VARRAY and the maximum size of the VARRAY is at least equal to a threshold enables VARRAY data storage to be substantially optimized. The efficiency of the VARRAY data storage is enhanced in that a relatively small amount of VARRAY data, e.g., data that is less than approximately thirty bytes in size, may be stored inline thereby avoiding the allocation of a LOB with LOB header information for the storage of the relatively small amount of VARRAY data. That is, LOB storage overhead is effectively eliminated for VARRAY data that is smaller than a threshold size, as for example a threshold size of approximately 4K bytes. Effectively eliminating, or significantly reducing, the amount of overhead associated with the storage of VARRAY data that is less than the threshold size will generally result in improved performance for the writing of and the reading of VARRAY data.

A VARRAY type evolution feature, which allows the maximum size of a VARRAY column associated with a VARRAY type to be increased, may be made more efficient by substantially exploiting the ability for VARAY columns of a VARRAY to support both inline VARRAY data and out-of-line VARRAY data. When the size limit associated with a VARRAY type is increased, for example, from less than approximately 4K bytes to more than approximately 4K bytes, the existing inline VARRAY data will be allowed to remain unchanged. That is, the VARRAY data that is stored in a row of a VARRAY column will not effectively be moved into a corresponding LOB and will, instead, remain as inline raw data. Since the cost of accessing all existing data during a type evolution, by allowing existing VARRAY data to remain unchanged after an evolution form a size of less than approximately 4K bytes to a size of more than approximately 4K bytes, the evolution may occur efficiently. Any new VARRAY data or updated of existing VARRAY data may be stored as a LOB locator with inline data in table space. It should be appreciated that substantially only unmodified existing data is stored as inline raw data.

Figure 6A:
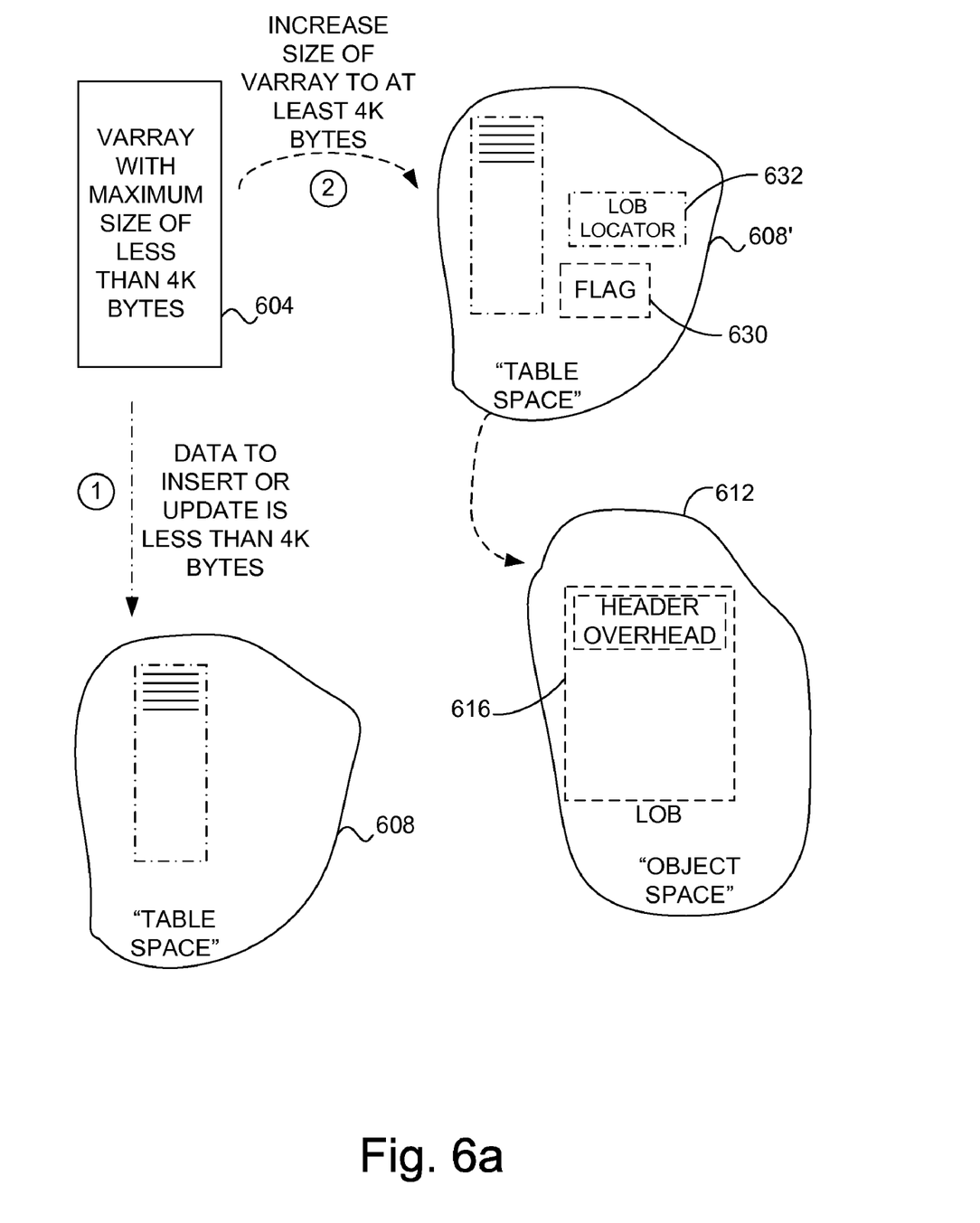
FIG. 6a is a diagrammatic representation of a VARRAY and a corresponding table space before and after the size of the VARRAY is increased from less than a threshold to a size that is at least the size of a the threshold in accordance with an embodiment of the present invention.
Figure 6B:
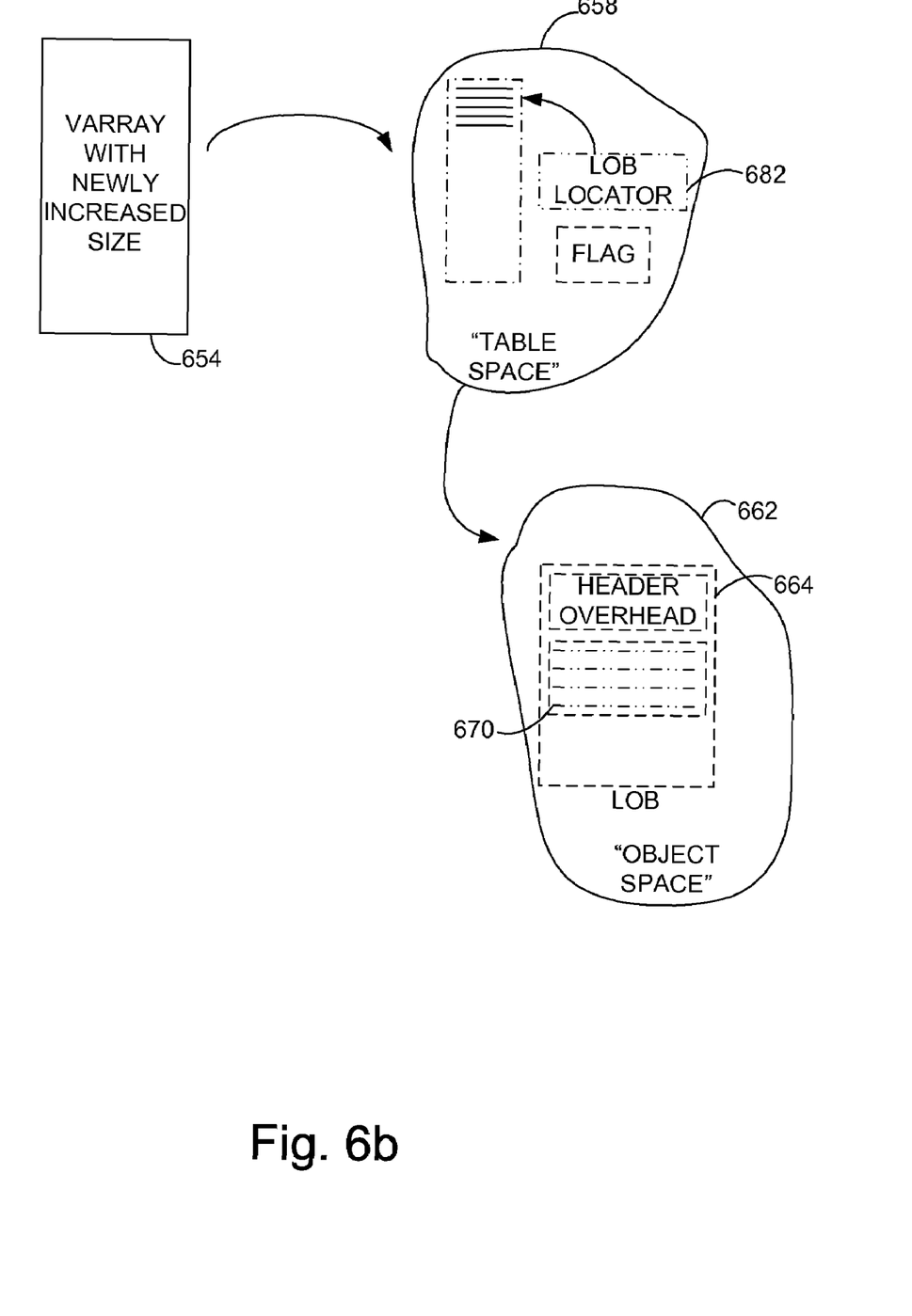
FIG. 6b is a diagrammatic representation of the storage of data which exceeds a threshold amount when a VARRAY has undergone a type evolution which results in an increased size in accordance with an embodiment of the present invention.

With reference to FIGS. 6a and 6b, a VARRAY type evolution feature in which the size of a VARRAY type is increased from less than a threshold amount to at least the threshold amount will be described in accordance with an embodiment of the present invention. FIG. 6a is a diagrammatic representation of a VARRAY and a corresponding table space before and after the size of the VARRAY is increased from less than a threshold to a size that is at least the size of a the threshold in accordance with an embodiment of the present invention. When data is to be stored in a VARRAY 604 with a maximum size of less than approximately 4K bytes which, in the described embodiment, is a threshold size, the data is inserted or updated in table space 608, or a memory that is used to store a table of VARRAY columns associated with VARRAY 604.

The format of inline raw data is distinguishable from a LOB locator with inline data. A LOB locator with inline data is distinguishable from a LOB locator with no inline data. Hence, existing inline raw data may be maintained as is, while allowing for new data to be stored as a LOB locator, either with or without inline data. Once a command is received to "evolve" VARRAY 604 from a size of less than approximately 4K bytes to a size of at least approximately 4K bytes, at least one flag 630, is stored into table space 608' to indicate that VARRAY 604 may have a column with inline VARRAY data and with VARRAY data stored in a LOB 616 within an object space 612. a LOBa LOB A check of whether flag 630 is present in table space 608', and whether LOB locator 632 is present in VARRAY data stored in table space 608', allows a suitable retrieval technique to be utilized to retrieve the VARRAY data.

When VARRAY data is less than approximately 4K bytes in size, the VARRAY data is stored inline in a VARRAY column. As shown in FIG. 6b, when VARRAY data 670 that exceeds a threshold size is to be stored in a column of a VARRAY 654, i.e., a VARRAY column with a newly increased size that has been increased from a size that is less than a threshold amount to a size that is at least equal to the threshold amount, VARRAY data 670 is stored as a VARRAY image in a LOB 664 in object space 662. A LOB locator 682 which identifies LOB 664 is stored into an appropriate row within table space 690 that is associated with the VARRAY column of VARRAY 654.

For an UPDATE or INSERT statement or command after VARRAY 654 undergoes a size increase that results in the maximum size of columns of VARRAY 654 being at least equal to a threshold size, if the new or updated VARRAY data is smaller than the threshold size, which may be approximately 4K bytes, the VARRAY data will be stored as a LOB locator with inline data within table space 658, unlike before an evolution, when it would be stored as inline raw data. Otherwise, if the new VARRAY data is larger than the threshold size, VARRAY data will be stored as a LOB, e.g., VARRAY data 670 is stored in LOB 664. By allowing a type evolution feature to be such that evolved VARRAY 654 may have columns with both inline raw data and data stored as a LOB locator, a data upgrade may occur without a significant performance penalty. In other words, the speed with which an overall system may operate is not significantly compromised even if there are a relatively large number of rows associated with columns of VARRAY 654 before the size increase, since it is not necessary to effectively form out-of-line images of all VARRAY data that has been stored inline.

Figure 7:
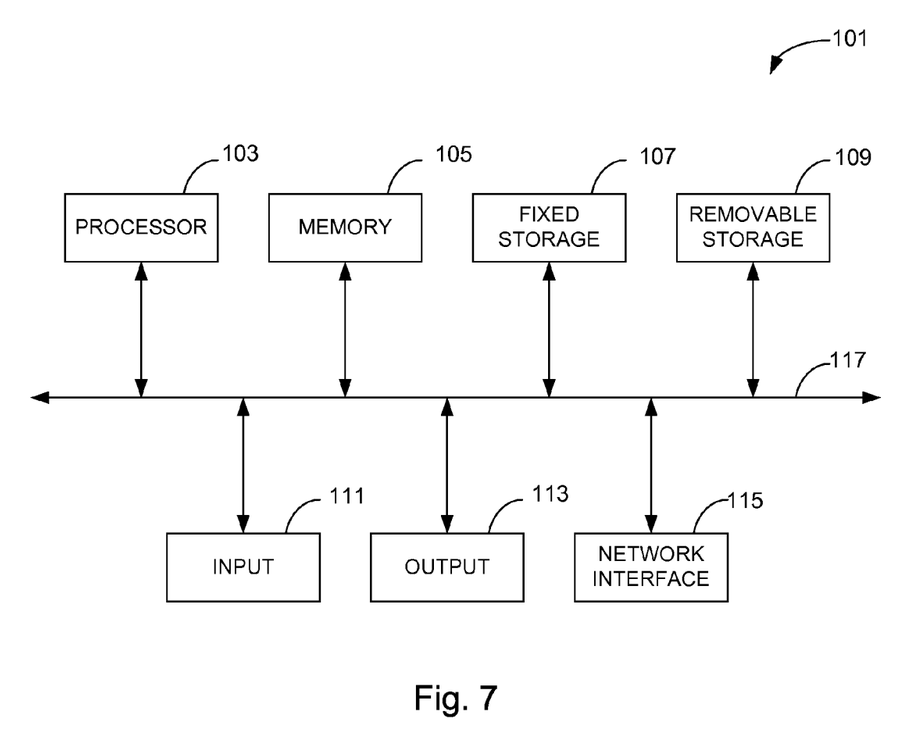
FIG. 7 is a block diagram of components that may be present in computer systems that implement embodiments of the present invention.

FIG. 7 shows a block diagram of components that may be present in computer systems that implement embodiments of the invention. A computer system 101 includes a processor 103 that executes instructions or commands from computer programs, including operating systems. Although processors typically have memory caches also, processor 103 utilizes memory 105, which may store instructions or computer code and data.

A fixed storage 107 may store computer programs and data such that it is typically persistent and provides more storage when compared to memory 105. At present, a common fixed storage is one or more hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of computer readable storage media that may be utilized to store and retrieve computer programs incorporating computer codes that implement the invention, data for use with the invention, and the like. Additionally, a data signal embodied in a carrier wave, e.g., in a network including the Internet, may be the computer readable storage medium. An input 111 allows a user to interface with the system. Input may be done through the use of a keyboard, a mouse, buttons, dials, or any other input mechanism. An output 113 allows the system to provide output to the user. Output may be provided through a monitor, display screen, LEDs, printer or any other output mechanism.

A network interface 115 allows the system to interface with a network to which it is connected. The system bus architecture of computer system 101 is represented by arrows 117. The components shown in FIG. 7 may be found in many network devices and computer systems. However, components may be added, deleted and combined. For example, fixed storage could be an array of hard drives or the fixed storage could be a file server that is accessed through a network connection. Thus, FIG. 7 is for illustration purposes and not limitation.

Although only a few embodiments of the present invention have been described, it should be understood that the present invention may be embodied in many other specific forms without departing from the spirit or the scope of the present invention. By way of example, while a value of approximately 4K bytes has generally been described as being a threshold below which VARRAY data is stored as inline raw data and above which VARRAY data is stored as an out-of-line image, the threshold value may vary widely. The 4K bytes generally represents a substantially maximum number of bytes which may be stored in a row of a column. Hence, the threshold value may generally be a maximum number of bytes which may be stored in a row of a column. Alternatively, the threshold value may be substantially any number of bytes as determined by an administrator of a system which uses VARRAYs.

While data associated with a VARRAY column has been described as being stored in a kernel internal LOB when the data has a size that is at least as large as a threshold, e.g., greater than or equal to approximately the maximum mount that may be stored inline in a row of a column, the data may generally be stored in substantially any suitable object. In addition, while an object in which data is stored is generally a kernel internal object, the object may be external to a kernel in some instances.

In general, the steps associated with the methods of the present invention may vary widely. Steps may be added, removed, altered, and reordered without departing from the spirit or the scope of the present invention. For instance, the steps associated with creating a VARRAY when no size limit is specified and a maximum possible size is greater than a threshold value may vary. As an example, the step of receiving a command to insert data or VARRAY values in a VARRAY may instead by a step of receiving a command to update data or VARRAY values associated with a VARRAY. Therefore, the present examples are to be considered as illustrative and not restrictive, and the invention is not to be limited to the details given herein, but may be modified within the scope of the appended claims.

What is claimed is:

1. A method for storing data in a variable array associated with a computing system, the variable array having an associated large object segment, the computing system having a memory and a kernel, the method comprising:
   determining a size of data, the data being associated with the variable array;
   determining when the size of the data is less than a threshold value;
   storing the data as inline raw data in a column of the variable array that is present in the memory when it is determined that the size of the data is less than the threshold value; and
   storing the data in an external large object when it is determined that the size of the data is not less than the threshold value, wherein the large object is associated with the variable array.

2. The method of claim 1 further including:
   creating the variable array, wherein creating the variable array includes creating the variable array to have an array limit that is substantially a maximum possible size for the variable array and creating the large object segment, the maximum possible size being greater than or approximately equal to the threshold value.

3. The method of claim 2 wherein the maximum possible size for the variable array is determined approximately based on a substantially maximum number of elements which may be stored in the variable array, a substantially maximum size of each of the elements which may be stored in the variable array, and an amount of system control information.

4. The method of claim 1 wherein storing the data in the external large object includes:
   creating the external large object; and
   storing a locator which identifies a location of the external large object, the locator being stored in place of the data.

5. The method of claim 1 wherein the threshold is approximately equal to a maximum number of bytes that may be stored in a row for the column.

6. The method of claim 1 wherein the large object is an internal large object to the kernel.

7. The method of claim 1 further including:
   receiving the data as a part of one of an update command and an insert command.

8. The method of claim 1 further including:
   increasing an array limit of the variable array from a first limit to a second limit, the first limit being less that the threshold value and the second limit being greater than or approximately equal to the threshold value.

9. The method of claim 8 further including:
   receiving the data as a part of one of an update command and an insert command.

10. The method of claim 8 wherein any data stored in the memory before the array limit is increased remains stored in the memory.

11. A computer-executable program product embodied using a hardware computer-readable medium comprising:
    computer code, when executed by a computer, to carry out a method for storing data in a variable array associated with a computing system, the variable array having an associated large object segment, the computing system having a memory and a kernel, the method comprising:
    determining a size of data to be determined, the data being associated with the variable array;
    determining when the size of the data is less than a threshold value;
    storing the data to be stored as inline raw data in a column of the variable array that is present in a memory when it is determined that the size of the data is less than the threshold value; and
    storing the data to be stored in a large object when it is determined that the size of the data is not less than the threshold value, wherein the large object is associated with the variable array and not included in the memory.

12. The computer program product of claim 11 wherein the variable array has an associated large object segment stored in the memory.

13. The computer program product of claim 11 wherein the method further comprises:
    creating the variable array, wherein the creating the variable array includes creating the variable array with an array limit that is substantially a maximum possible size for the variable array and creating the large object segment, the maximum possible size being greater than or approximately equal to the threshold value.

14. The computer program product of claim 11 wherein the threshold is approximately equal to a maximum number of bytes that may be stored in a row for the column.

15. The computer program product of claim 11 wherein the method further comprises:
    increasing an array limit of the variable array from a first limit to a second limit, the first limit being less that the threshold value and the second limit being greater than or approximately equal to the threshold value; and
    storing a flag in the memory to indicate that the data is arranged to be stored as a large object locator with inlined data when it is determined that the size of the data is less than the threshold value and that the data is arranged to be stored in the large object when it is determined that the size of the data is not less than the threshold value.

16. The method of claim 11 wherein the hardware computer-readable medium comprises at least one of a memory, fixed storage, hard drive, or removable storage.

17. The method of claim 11 wherein the removable storage comprises at least one of a tape, diskette, floppy disk, flash memory, flash drive, or CD-ROM.

18. The method of claim 11 wherein the memory comprises at least one of system memory or cache memory.

19. A system for storing data in a variable array, the variable array having an associated large object segment, the system comprising:
    a memory;
    a kernel;
    means for determining a size of data, the data being associated with the variable array;

means for determining when the size of the data is less than a threshold value;

means for storing the data as inline raw data in a column of the variable array that is present in the memory when it is determined that the size of the data is less than the threshold value; and means for storing the data in a large object when it is determined that the size of the data is not less than the threshold value, wherein the large object is associated with the variable array and is internal to the kernel.

20. The system of claim 19 further including:

means for creating the variable array, wherein the means for creating the variable array include means for creating the variable array to have an array limit that is substantially a maximum possible size for the variable array and means for creating the large object segment, the maximum possible size being greater than or approximately equal to the threshold value.

21. The system of claim 20 wherein the maximum possible size for the variable array is determined approximately based on a substantially maximum number of elements which may be stored in the variable array, a substantially maximum size of each of the elements which may be stored in the variable array, and an amount of system control information.

22. The system of claim 19 wherein the means for storing the data in the large object include:

means for creating the large object; and means for storing a locator which identifies a location of the large object, the locator being stored in the memory.

23. The system of claim 19 wherein the threshold is approximately equal to a maximum number of bytes that may be stored in a row for the column.

24. The system of claim 19 further including:

means for increasing an array limit of the variable array from a first limit to a second limit, the first limit being less that the threshold value and the second limit being greater than or approximately equal to the threshold value; and means for storing a flag in the memory to indicate that the data is arranged to be stored as inline raw data when it is determined that the size of the data is less than the threshold value and that the data is arranged to be stored in the large object when it is determined that the size of the data is not less than the threshold value.

25. A variable array data structure embodied using a hardware computer-readable medium comprising:

a first segment, the first segment being arranged to indicate that the data structure is arranged to include at least one column which is associated with a first set of data, the first set of data including at least a threshold number of bytes; and a first column of the first segment, the first column containing a second set of data, the second set of data including less than the threshold number of bytes and being inlined in the first column.

26. The variable array data structure of claim 25 wherein the first segment is a large object segment that is allocated when the variable array data structure is created.

27. The variable array data structure of claim 25 wherein the hardware computer-readable medium comprises at least one of a memory, fixed storage, hard drive, or removable storage.

28. A method for storing variable array data in a variable array associated with a computing system, the variable array having an associated large object segment, the computing system having a table space, the method comprising:

determining a size of the variable array data;

determining when the size of the variable array data is less than a threshold value;

storing the variable array as large object segment locator with inline data in a first column of the variable array that is present in the table space when it is determined that the size of the variable array data is less than the threshold value;

storing the variable array data out-of-line in a large object internal to a kernel when it is determined that the size of the variable array data is not less than the threshold value; and storing a large object locator in the variable array when it is determined that the size of the variable array data is not less than the threshold value, wherein the large object locator is arranged to identify the large object and is stored in a second column of the variable array.

29. The method of claim 28 further including:

creating the variable array in response to a create command, the create command being specified without an array limit, wherein creating the variable array includes creating the variable array to have an array limit that is substantially a maximum possible size for the variable array and creating the large object segment, the maximum possible size being greater than or approximately equal to the threshold value.

30. The method of claim 29 wherein the threshold is approximately a maximum number of bytes that may be stored in a row of the first column.

31. A method for evolving a variable array associated with a computing system, the variable array being created using an array limit that is less than a threshold array limit, the computing system having a table space, the method comprising:

increasing a size of the variable array from less than the threshold array limit to at least the threshold array limit; and storing an indicator, the indicator being arranged to indicate that a column of the variable array in table space may include both inline variable array data and out-of-line variable array data that is stored in an associated large object.

32. The method of claim 31 further including:

determining a size of variable array data to be stored in the column;

determining when the size of the variable array data is less than a threshold value;

inlining the variable array data in the column of the variable array when it is determined that the size of the variable array data is less than the threshold value;

storing the variable array data out-of-line in a large object internal to a kernel when it is determined that the size of the variable array data is not less than the threshold value; and storing a large object locator in the column of the variable array when it is determined that the size of the variable array data is not less than the threshold value, wherein the large object locator is arranged to identify the large object.

33. The method of claim 31 wherein the threshold is approximately a maximum number of bytes that may be stored in a row of the first column.

* * * * *

UNITED STATES PATENT AND TRADEMARK OFFICE
CERTIFICATE OF CORRECTION

PATENT NO. : 7,320,061 B2 Page 1 of 1
APPLICATION NO. : 10/912426
DATED : January 15, 2008
INVENTOR(S) : Yu et al.

It is certified that error appears in the above-identified patent and that said Letters Patent is hereby corrected as shown below:

In column 3, line 6, after "LOB." delete "a LOB".

In column 3, line 23, after "346." delete "A LOB".

In column 3, line 47, after "columns" insert -- . --.

In column 11, line 65, in Claim 8, delete "that" and insert -- than --, therefor.

In column 12, line 43, in Claim 15, delete "that" and insert -- than --, therefor.

In column 13, line 37, in Claim 24, delete "that" and insert -- than --, therefor.

Signed and Sealed this

Second Day of September, 2008

JON W. DUDAS
*Director of the United States Patent and Trademark Office*